United States Patent
Matyjek (10) Patent No.: US 9,047,414 B1
(45) Date of Patent: Jun. 2, 2015

(54) METHOD AND APPARATUS FOR GENERATING AUTOMATED TEST CASE SCRIPTS FROM NATURAL LANGUAGE TEST CASES

(75) Inventor: Michal Matyjek, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 406 days.

(21) Appl. No.: 13/048,784

(22) Filed: Mar. 15, 2011

(51) Int. Cl.
*G06F 9/44* (2006.01)
*G06F 9/45* (2006.01)
*G06F 11/36* (2006.01)

(52) U.S. Cl.
CPC ........ *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,754,755 | A * | 5/1998 | Smith, Jr. ...................... | 714/38.1 |
| 2006/0048100 | A1* | 3/2006 | Levy et al. ..................... | 717/124 |
| 2006/0101331 | A1 | 5/2006 | Wang et al. | |
| 2006/0230326 | A1* | 10/2006 | Potts et al. .................... | 714/741 |
| 2006/0253742 | A1* | 11/2006 | Elenburg et al. ................ | 714/38 |
| 2008/0086348 | A1* | 4/2008 | Rao et al. .......................... | 705/7 |
| 2008/0126880 | A1* | 5/2008 | Hegarty et al. ................. | 714/46 |
| 2008/0244524 | A1* | 10/2008 | Kelso ............................. | 717/124 |
| 2009/0199096 | A1* | 8/2009 | Pop-Jordanov et al. ....... | 715/704 |
| 2011/0202901 | A1* | 8/2011 | Givoni et al. .................. | 717/125 |
| 2012/0072823 | A1* | 3/2012 | Lau et al. ....................... | 715/234 |

OTHER PUBLICATIONS

Kelly, Michael, "Choosing a test automation framework", IBM developerWorks Techincal Library, Nov. 20, 2003.*
Leitao et al., "NLForSpec: Translating Natural Language Descriptions into Formal Test Case Specifications"; In proceeding of: Proceedings of the Nineteenth International Conference on Software Engineering & Knowledge Engineering (SEKE'2007), Boston, Massachusetts, USA, Jul. 9-11, 2007.*
Muchado et al., "Automatic Test-Case Generation", Testing Techniques in Software Engineering Lecture Notes in Computer Science vol. 6153, 2010, pp. 59-103.*
Nagle, Carl. "Test automation frameworks." URL: http://safsdev.sourceforge. net/DataDrivenTestAutomationFrameworks. htm (2000).*
Boyapati, Chandrasekhar, et al, "Korat: Automated Testing Based Java Predicates," ACM, 2002, pp. 123-133.
"Automatic Test Case Generation," Software Design Group, 2002-2004, <http://sdg.csail.mit.edu/projects/testera.hml>, Accessed Feb. 23, 2011, 2 pages.

* cited by examiner

*Primary Examiner* — Isaac T Tecklu
(74) *Attorney, Agent, or Firm* — Lowenstein Sandler LLP (57) ABSTRACT

A method and apparatus for generating automated test case scripts from natural language test cases is described. The method may include receiving a natural language test case for testing a software application. The method may also include parsing the received natural language test case to locate terms relevant to testing a software application within the natural language test case, selecting one or more of the terms, and causing a search of a testing framework system for automated testing script commands based on the selected terms. The method may also include generating an automated test case script that corresponds to the natural language test case based on results of the search.

20 Claims, 5 Drawing Sheets

METHOD AND APPARATUS FOR GENERATING AUTOMATED TEST CASE SCRIPTS FROM NATURAL LANGUAGE TEST CASES

TECHNICAL FIELD

Embodiments of the invention relate to the field of software application testing, and more particularly, to generating automated testing scripts for software application testing.

BACKGROUND

Software testing is an investigation that is conducted to determine whether a particular software application works as expected. Test techniques include, but are not limited to, the process of executing a program or application in a controlled environment with specific stimuli. Such testing is conducted with the intent of finding errors, flaws, mistakes, etc. in the software application.

As software applications grow in size and complexity, more powerful testing techniques become necessary. Once such technique involves automated testing that utilizes a testing framework to control the execution of the software application being tested. Quality assurance engineers must still design and program the tests run by the testing framework. However, testing frameworks have streamlined this process by providing pre-written, or canned, test commands. The quality assurance engineer may then assemble the test commands into a larger testing application that is run and monitored by the testing framework. However, designing, writing, and implementing a testing application, even with the aid of the pre-written test commands of a testing framework, is very labor intensive and error prone.

SUMMARY

A method and apparatus for generating automated test case scripts from natural language test cases is described. According to an exemplary method, a computing system receives a natural language test case for testing a software application. In one embodiment, the received natural language test case is parsed to locate terms relevant to testing a software application within the natural language test case, and one or more of the terms are selected. In one embodiment, a search of a testing framework system for automated testing script commands is caused based on the selected terms.

In some embodiments, the exemplary method includes receiving an automated test script template and generating the automated test script by writing automated testing script commands found in the search to the automated test script template. In some embodiments, the test script template is an empty script program that, when populated with one or more automated testing script commands, results in an automated testing program executable by the testing framework system.

In some embodiments, the exemplary method includes transmitting the selected one or more terms to the testing framework system and receiving one or more automated testing script commands from the testing framework system located by the testing framework system in a search based on the selected one or more terms. In some embodiments, each automated testing script command enables the testing framework system to control the software application.

In some embodiments, the natural language test case specifies at least one of a condition, a variable, and a command utilized to test the software application. In some embodiments, the exemplary method includes storing the generated automated test case script in a memory of the computing system. In some embodiments, the method includes providing the automated test case script to the testing framework system to test the software application.

In addition, a computer readable storage medium for generating automated test case scripts from natural language test cases is described. An exemplary computer readable storage medium provides instructions, which when executed on a processing system, causes the processing system to perform a method such as the exemplary methods discussed above.

Furthermore, a system for generating automated test case scripts from natural language test cases is described. An exemplary system may include a memory and a processor coupled with the memory to execute an automated test case script generator. In some embodiments of the exemplary system, the processor receives a natural language test case for testing a software application. In one embodiment of the exemplary system, the received natural language test case is parsed by the processor to locate terms relevant to testing a software application within the natural language test case, and one or more of the terms are selected. In one embodiment of the exemplary system, a search of a testing framework system for automated testing script commands is caused based on the selected terms. In one embodiment of the exemplary system, an automated test case script is generated that corresponds to the natural language test case based on results of the search.

In some embodiments of the exemplary system, an automated test script template is received and the automated test script is generated by writing automated testing script commands found in the search to the automated test script template. In some embodiments of the exemplary system, the test script template is an empty script program that, when populated with one or more automated testing script commands, results in an automated testing program executable by the testing framework system. In some embodiments of the exemplary system, the processor further transmits the selected one or more terms to the testing framework system and receives one or more automated testing script commands from the testing framework system located by the testing framework system in a search based on the selected one or more terms.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for generating automated test case scripts from natural language test cases is described. In one embodiment, the method includes receiving, with a computing system, a natural language test case for testing a software application. The method may also include parsing the received natural language test case to locate terms relevant to testing a software application within the natural language test case and selecting one or more of the terms. In one embodiment, the method may also include causing a search of a testing framework system for automated testing script commands based on the selected terms. In one embodiment, the method may also include generating an automated test case script that corresponds to the natural language test case based on results of the search.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "searching", "generating", "parsing", "selecting", "transmitting", "storing", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
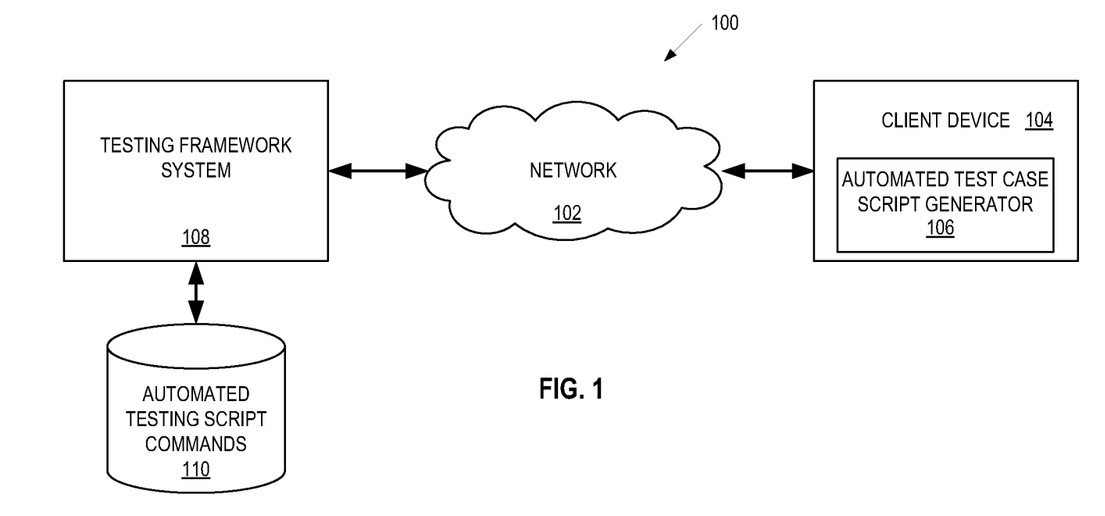
FIG. 1 is a block diagram of exemplary system architecture for generating automated test case scripts from natural language test cases.

FIG. 1 is a block diagram of exemplary system architecture 100 for generating automated test case scripts from natural language test cases. In one embodiment, the system 100 includes a client device 104 and a testing framework system 108. In one embodiment, client device 104 may be a computing device, such as a personal computer, personal digital assistant, laptop computer, tablet computer, etc. The testing framework system 108 may also be a computing device, such as a server computer, desktop computer, etc.

The client device 104 and the testing framework system 108 may be coupled to a network 102 that communicates any of the standard protocols for the exchange of information. They may run on one Local Area Network (LAN) and may be incorporated into the same physical or logical system, or different physical or logical systems. Alternatively, the client device 104 and the testing framework system 108 may reside on different LANs that may be coupled together via the Internet but separated by firewalls, routers, and/or other network devices. In yet another configuration, the client device 104 and the testing framework system 108 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The testing framework system 108 is responsible for providing a set of utilities for testing software application. In one embodiment, one of the utilities provide by testing framework system 108 is a library of automated testing script commands 110. The automated testing script commands are pre-written, or canned, software scripts designed to control the operation of another software application (e.g., the software application being tested by the testing framework). For example, the automated testing script commands may include commands that can be executed by the testing framework system 108 for opening applications, loading data, simulating user interactions, etc. In one embodiment, these automated testing script commands may be grouped together in an automated testing script program for testing a software application. The testing framework system 108 may provide other testing utilities such as performance measurement utilities, program execution logs, generation of graphical user interface reports for software tests, etc.

The client device 104 is responsible for generating and conducting tests on a software application (not shown) using the testing framework system 108. In one embodiment, client device 104 generates one or more test cases for testing different aspects of a software application. In one embodiment, a software test case includes a set of conditions, variables, and commands which are utilized to determine whether the software application is working according to program specifications and requirements. For example, a test case may include providing input to a software application that is known to be outside of a supported data range, and ensuring that the software application rejects the data, issues a warning, or otherwise performs an expected remedial action. In one embodiment, client device 104 receives one or more software test cases via user input at client device 104, such as test cases inputted directly by a quality assurance (QA) engineer, a file loaded by client device 104 that includes test cases previously written or defined by the QA engineer, etc.

In one embodiment, client device 104 receives one or more natural language test cases. In contrast to a conventional test case, which is a piece of software code written in a testing programming language to be interpreted and run by testing framework system 108, a natural language test case is a written test case that uses words typed in the same way that a person would normally speak. For example, instead of a series of computer programming commands, a natural language test case might read:

Test Case 1:
1. Load software application;
2. Select user interface element X;
3. Type "Hello World" in a text entry field of element X; and
4. Determine whether "Hello World" is displayed properly by software application.

In one embodiment, client device 104 hosts automated test case script generator 106 that receives natural language test cases and generates an automated testing script that implements the natural testing case. In one embodiment, the automated testing script generated by automated test case script generator 106 is software application code that is utilized by testing framework system 108 to control a software application being tested. That is, automated test case script generator 106 generates a scripting language program that can be run by testing framework system 106. Testing framework system 108 may then automatically carry out the operations specified in the natural language test case in an automated testing environment.

In one embodiment, in order to generate an automated testing script, automated test case script generator 106 facilitates a search against a plurality of testing script commands 110 stored at testing framework system 108. In one embodiment, automated test case script generator 106 analyzes the natural language test case in order to generate one or more query terms. Those query terms are then used to search a database 110 of testing script commands at testing framework system 108. The search may be a text-based search against documentation that corresponds to the testing script commands, search against an index generated from the testing script code or documentation, etc. In one embodiment, automated test case script generator 106 utilizes the search results to determine which testing script commands of the testing framework system 108 correspond to commands in a natural language test case.

In one embodiment, automated test case script generator 106 utilizes the located testing script commands, which correspond to the natural language test case commands, to create an automated test case script for execution by the testing framework system 108. In one embodiment, the script generated by automated test case script generator 106 enables testing framework system 108 to automatically run the test script converted from the natural language test case. In one embodiment, the script generated by automated test case script generator 106 may be stored at client device 104, transmitted to testing framework system 108, or transmitted to another device (not shown) via network 102.

Figure 2:
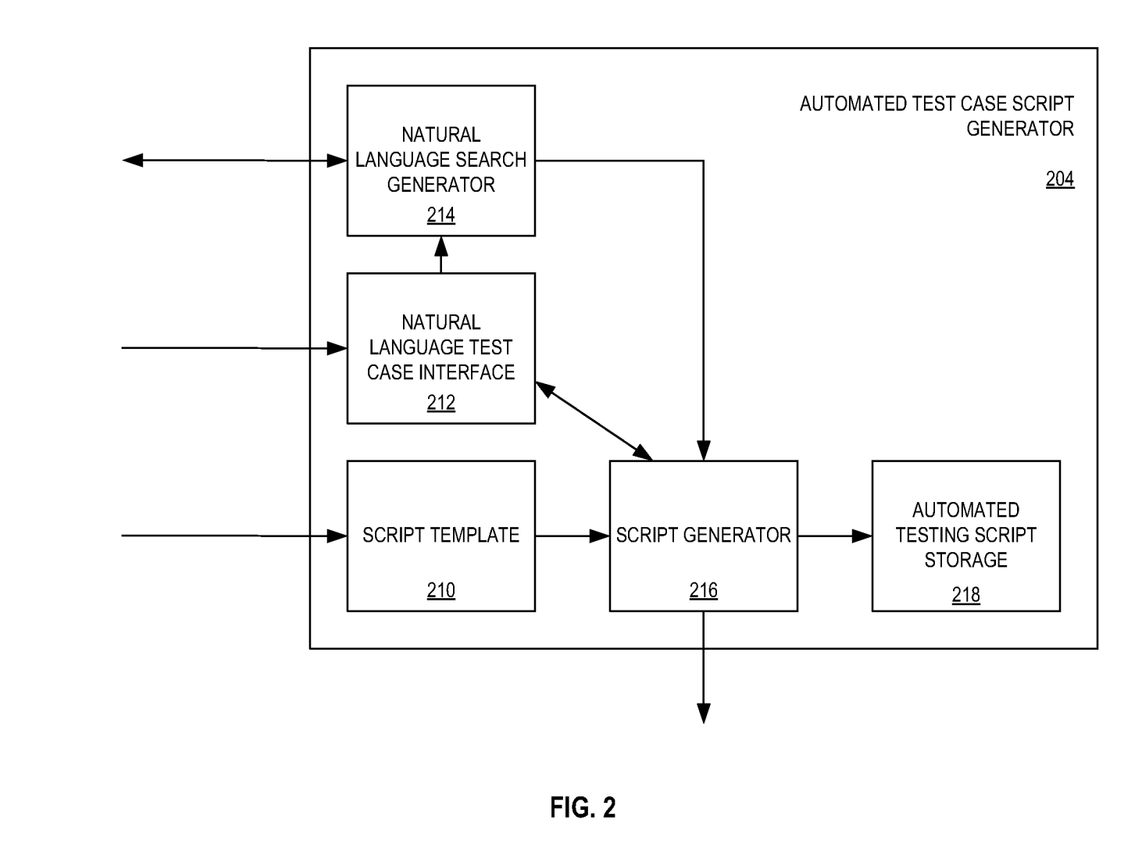
FIG. 2 is a block diagram of one embodiment of an automated test case script generator.

FIG. 2 is a block diagram of one embodiment of an automated test case script generator 204. Automated test case script generator 204 provides additional details for the automated test script generator 104 discussed above in FIG. 1. Automated test case script generator 204 may include a natural language test case interface 212, a natural language search generator 214, a script template 210, a script generator 216, and an automated testing script storage 218.

In one embodiment, natural language test case interface 212 is responsible for receiving natural language test cases for testing a software application. As discussed above, a natural language test case is a set of commands, condition, and variables written in the same way that a person would normally speak them, rather than a series of computer programming commands. Natural language test case interface 212 may receive natural language test cases typed by a user. In another embodiment, natural language test case interface 212 may receive natural language test cases by loading a file from a location specified by a user. In yet another embodiment, natural language test case interface 212 may provide a graphical user interface to enable a user to make test case selections.

In one embodiment, natural language search generator 214 receives the natural language test cases and generates one or more search terms. In one embodiment, natural language search generator 214 parses the natural language search terms to locate significant terms for testing. The natural language search generator 214 may also parse the natural language test case in order to exclude insignificant words such as "the", "a", etc. The search terms, as discussed below, are utilized by natural language search generator 214 to find automated testing script commands that correspond to natural language test case commands.

In one embodiment, natural language search generator 214 initiates a search at a testing framework system (e.g., testing framework system 108) using the generated search terms. In one embodiment, a search engine of the testing framework system uses the search terms to search against a database of automated testing script commands. Natural language search generator 214 receives one or more scripts located by the testing framework system based on the generated search terms. In one embodiment, the scripts are automated testing script commands that correspond to the natural language test case commands that were received by natural language test case interface 212. Natural language search generator 214 provides the scripts to script generator 216.

In one embodiment, script generator 216 is responsible for generating an automated test case script from the automated testing script commands provided by natural language search generator 214. In one embodiment, script generator 216 utilizes a script template 210 as the initial building block for an automated testing script. The script template 210 is a skeleton for an automated testing script and contains a shell program that, when populated with the received automated testing scripts, results in a fully functional automated testing script program that can be executed by a testing framework system. In one embodiment, the script template 210 includes data specific to the software application that is to be tested, such as an initialization block, an execution block, a cleanup block, etc.

In one embodiment, script generator 216 utilizes the initial natural language test case received by the natural language test case interface 212 in order to place the received automated testing script commands into the script template 210. Script generator 216 places the received automated testing script commands into the script template 210 in the same order that testing commands appear in the natural language test case. As a result, automated testing script commands that were located by the search generator 214 may be written into the script template 210 to correspond with the order testing commands were written in the natural language test case. The resulting automated testing script created by script generator 216 contains the testing logic needed for an automated testing script to implement the original natural language test case.

In one embodiment, script generator 216 outputs the resulting automated testing script to automated testing script storage 218. In another embodiment, script generator 216 transmits the resulting automated testing script to another system, such as by emailing the automated testing script to a receiving system, storing the automated testing script to a system on a network, etc. The automated testing script may then be used by a testing framework system to test a software application.

Generating automated test case scripts from natural language test cases streamlines test case creation and automation. Improving the efficiency and accuracy of resulting automated test cases is very important to software testing professionals, such as quality assurance engineers. Furthermore, improving the testing utilities for software application development will ensure that properly functioning software applications are created more economically.

Figure 3:
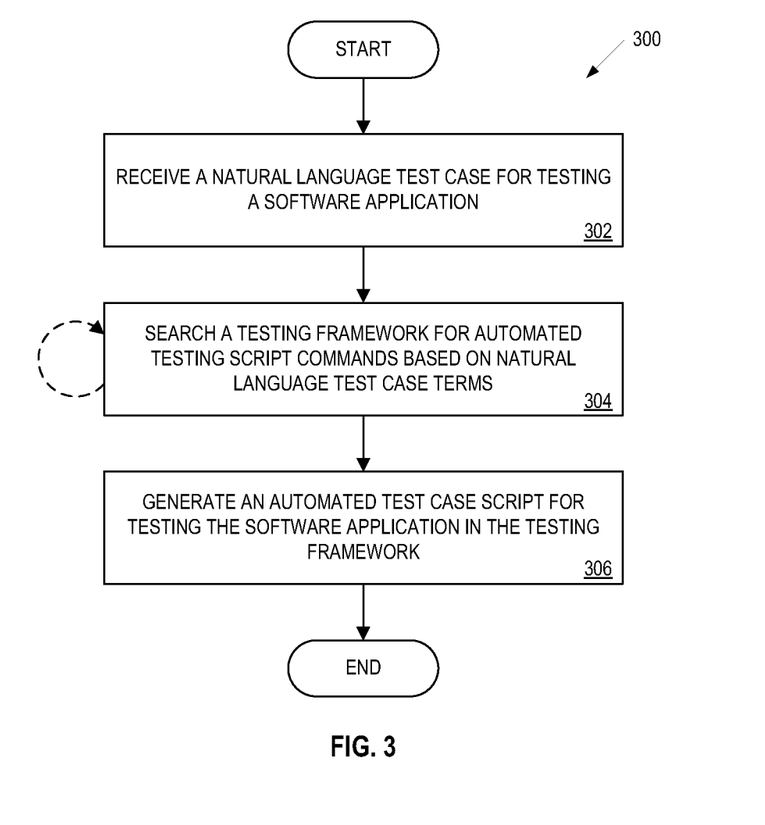
FIG. 3 is a flow diagram of one embodiment of a method for generating an automated test case script from a natural language test case.

FIG. 3 is a flow diagram of one embodiment of a method 300 for generating an automated test case script from a natural language test case. The method 300 is performed by processing logic that may comprise hardware (circuitry, dedicated logic, etc.), software (such as is run on a general purpose computer system or a dedicated machine), firmware, or a combination. In one embodiment, the method 300 is performed by an automated test case script generator (e.g., automated test case script generator 106 of FIG. 1 or automated test case script generator 204 of FIG. 2).

Referring to FIG. 3, processing logic begins by receiving a natural language test case for testing a software application (processing block 302). As discussed above, a natural language test case is a set of conditions, variables, commands, etc., written in the same way that a person would normally speak them. The conditions, variables, commands, etc. are intended to test the functions of a software application. The natural language test case may be received from a user, such as a quality assurance engineer that intends to test whether the software application satisfies the requirements and specification associated with the software application. Rather than a sequence of computer programming commands, the received natural language testing commands for a natural language test case that performs a scan of a software application might be written as:

Test Case SQL—Basic Scanning:
1. Configure Discover for SQL scanning; and
2. Run a scan; and
3. Expect scan runs properly generating incidents.

Processing logic causes a search of a testing framework for automated testing script commands based on the natural language test case terms (processing block 304). As discussed herein, the words in the natural language test case are utilized to search against a database of pre-written automated testing script commands. In one embodiment, the automated testing script commands correspond with testing functions provided by a testing framework system, and that can be executed by the testing framework system when testing a software application. That is, a testing framework system may provide a number of pre-written, or canned, testing script commands that provide specific testing functions when executed by the testing framework system. For example, the testing framework system may provide pre-written testing script commands for opening an application, loading data into the application, simulating various kinds of user input into a software application, etc. Testing framework systems generally provide a comprehensive set of testing tools for testing various kinds of software applications. Thus, based on the search of the testing script commands available at the testing framework system, one or more automated testing script commands, which correspond to the commands, variables, and conditions specified in the natural language test case, are located by processing logic.

Processing logic then generates an automated test case script for testing the software application in the testing framework (processing block 306). In one embodiment, the automated test case script includes the located pre-written testing script commands provided by a testing framework system. In one embodiment, the automated test case script may be executed by the software testing framework in order to test the software application. In other words, the script enables the testing framework to control the software application being tested. Furthermore, because the script is generated from the natural language test cases, the testing framework performs automated tests specified in the natural language test cases.

Figure 4:
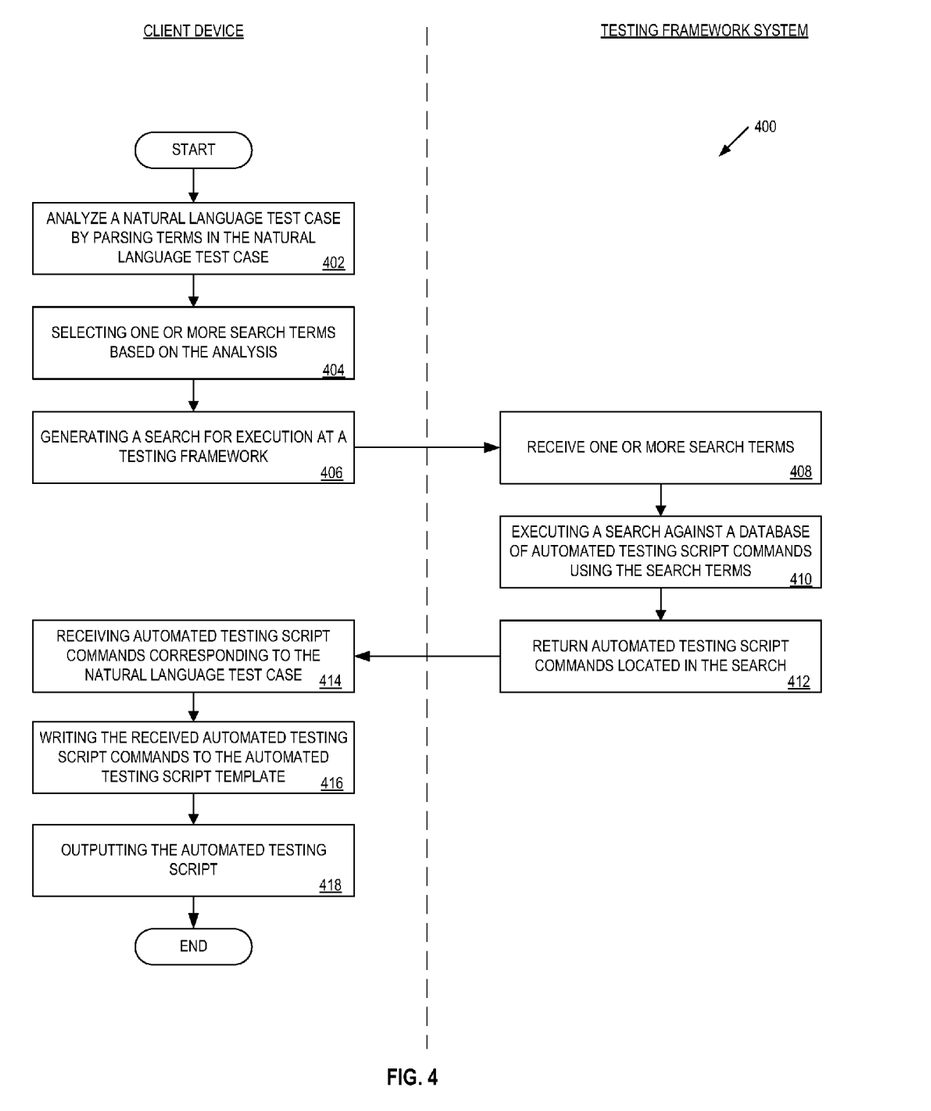
FIG. 4 is a flow diagram of one embodiment of a method for a client device and a testing framework system generating an automated test case script.

FIG. 4 is a flow diagram of one embodiment of a method 400 for a client device and a testing framework system generating an automated test case script. The method 400 is performed by processing logic that may comprise hardware (circuitry, dedicated logic, etc.), software (such as is run on a general purpose computer system or a dedicated machine), firmware, or a combination. In one embodiment, the method 400 is performed by an automated test case script generator and a testing framework (e.g., automated test case script generator 106 of FIG. 1 or automated test case script generator 204 of FIG. 2, and testing framework 108 of FIG. 1). In one embodiment, the automated test case script generator and testing framework may reside at different devices, such as a client device and a testing framework system, and communicate with one another over a computer network. In another embodiment, the automated test case script generator and testing framework may reside in the same device.

Referring to FIG. 4, processing logic begins by analyzing a natural language test case by parsing terms in the natural language test case (processing block 402). One or more terms are selected by processing logic based on the analysis (processing block 404). In one embodiment, processing logic parses the language to locate significant terms in the natural language test case. For example, processing logic may parse the words of a natural language test case in order to remove non-essential words, such as "the" or "a". Then, in the example, the remaining words that have not been removed can be considered significant for locating automated testing script that corresponds to a natural language test case. In one embodiment, the parsing may be used to locate specific words, such as those that appear within documentation for automated testing scripts of a testing framework system.

Processing logic generates a search for execution at a testing framework (processing block 406). In one embodiment, the search is a natural language search and is based on the terms selected in processing block 404.

One or more search terms are received by processing logic of a testing framework system (processing block 408). Processing logic then executes a search against a database of automated testing script commands using the search terms (processing block 410). In one embodiment, the search may be executed against an index generated from the available automated testing script commands. In another embodiment, the search may be executed against documentation for the automated testing script commands, such as a text search executed against JAVADOC™ documentation generated from the automated testing script commands of a testing framework system. The automated testing script commands located in the search are then returned to processing logic of a client device (processing block 412).

Processing logic of a client device receives the automated testing script commands corresponding to the natural language test case (processing block 414). The automated testing script commands are then written to an automated testing script template (processing block 416). When the template is filled with the automated testing script commands, a fully functional automated testing script application is created that can be executed by a testing framework system. For example, an automated testing script generated from a template for the SQL-Basic Scanning natural language test case discussed above is provided below in Table 1:

TABLE 1

```
########################################################
# SQL-Basic Scanning
# Description: Basic scan works end-to-end
########################################################
########################################################
# Initialization of application to be
# tested provided by template
########################################################
SetProperty testcase_id "QC_12345"
SetProperty target_name [testcase_id] "_tgt"
########################################################
# 1 Configure Discover for SQL scanning including
# functions retrieved by searching available script
# commands
########################################################
StartCreatingDiscoverTarget name [targe_name] SQLDatabase
    SetContentRoot <provide server name here>
EndCreatingDiscoverTarget
########################################################
# 2 Run a scan.
########################################################
RunDiscoverTargetScan [target_name]
########################################################
# 3 Expected: scan runs properly incidents generating
########################################################
VerifyItemsScanned [target_name] <provide items expected>
VerifyIncidentsGenerated [target_name] <provide incidents
expected>
########################################################
# Cleanup also be provided by template
########################################################
RemoveTargetData [target_name]
```

Processing logic outputs the automated testing script (processing block 418). In one embodiment, the automated testing script is outputted to a storage device. In another embodiment, the automated testing script is transmitted to a remote system, such as by email or by causing the automated testing script to be stored on a remote device.

Figure 5:
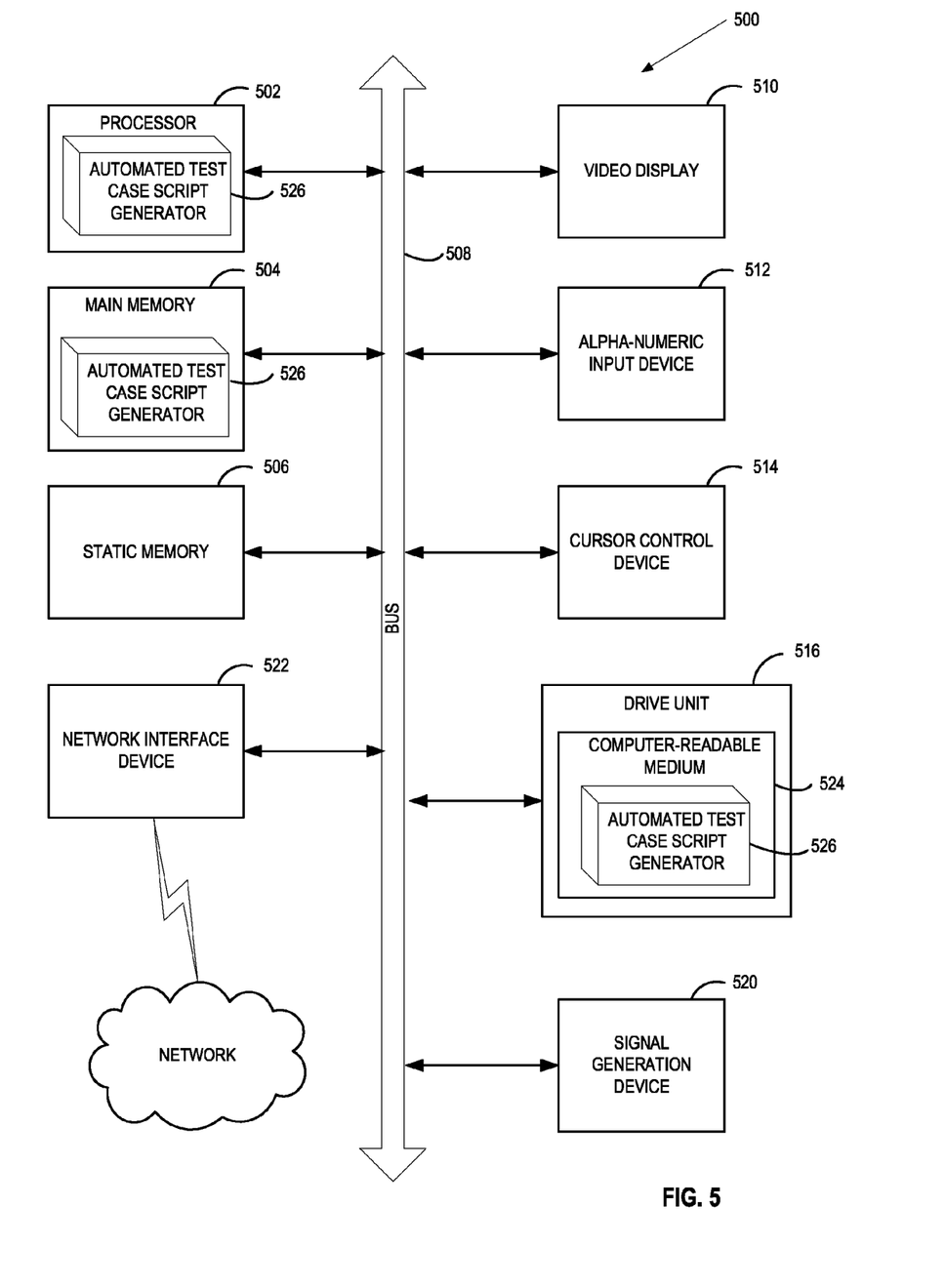
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a netbook, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer-implemented method comprising:
receiving, with a computing system from a user, a natural language test case for testing a software application, wherein the natural language test case is a test case written in a natural language, the test case comprising at least one of a condition, a variable, or a command that is executed by the software application to determine whether the software application is working according to program specifications, the natural language test case comprising a natural language command, wherein the natural language command is written as a user speaks and is distinct from a computer programming command;
parsing the natural language command of the received natural language test case to locate one or more search terms used to search for a corresponding term associated with an automated testing script command;
causing a search of a testing framework system to be performed for the automated testing script command, wherein the one or more search terms are used to search at least one of an index or a document to locate the corresponding term associated with the automated testing script command, wherein the corresponding term is distinct from the automated testing script command and used to locate the automated testing script command; and
generating an automated test case script that corresponds to the natural language test case based on a result of the search, wherein the automated test case script comprises the automated test script command.

2. The computer-implemented method of claim 1, further comprising:
receiving an automated test script template; and
generating the automated test script by writing the automated testing script command to the automated test script template.

3. The computer-implemented method of claim 2, wherein the test script template is an empty script program and the method further comprises:
populating the empty script program with the automated testing script command to create an automated testing program executable by the testing framework system.

4. The computer-implemented method of claim 1, further comprising:
transmitting the one or more search terms to the testing framework system; and
receiving the automated testing script command from the testing framework system, the automated testing script command being located by the testing framework system in a search based on the one or more search terms.

5. The computer-implemented method of claim 4, wherein the automated testing script command enables the testing framework system to control the software application.

6. The computer-implemented method of claim 1, wherein the natural language command comprises at least one of the condition, the variable, or the command utilized to test the software application.

7. The computer-implemented method of claim 1, further comprising:
storing the generated automated test case script in a memory of the computing system.

8. The computer-implemented method of claim 1, further comprising:
providing the automated test case script to the testing framework system to test the software application.

9. A non-transitory computer readable storage medium including instructions that, when executed by a processing device, cause the processing device to perform operations comprising:
receiving from a user a natural language test case for testing a software application, wherein the natural language test case is a test case written in a natural language, the test case comprising at least one of a condition, a variable, or a command that is executed by the software application to determine whether the software application is working according to program specifications, the natural language test case comprising a natural language command, wherein the natural language command is written as a user speaks and is distinct form a computer programming command;
parsing the natural language command of the received natural language test case to locate one or more search terms used to search for a corresponding term associated with an automated testing script command;
causing a search of a testing framework system to be performed for the automated testing script command, wherein the one or more search terms are used to search at least one of an index or a document to locate the corresponding term associated with the automated testing script command, wherein the corresponding term is distinct from the automated testing script command and used to locate the automated testing script command; and
generating an automated test case script that corresponds to the natural language test case based on a result of the search, wherein the automated test case script comprises the automated test script command.

10. The computer readable storage medium of claim 9, further comprising:
receiving an automated test script template; and
generating the automated test script by writing the automated testing script command to the automated test script template.

11. The computer readable storage medium of claim 10, wherein the test script template is an empty script program and further comprising:
populating the empty script program with the automated testing script command to create an automated testing program executable by the testing framework system.

12. The computer readable storage medium of claim 9, further comprising:
transmitting the one or more search terms to the testing framework system; and
receiving the automated testing script command from the testing framework system, the automated testing script command being located by the testing framework system in a search based on the one or more search terms.

13. The computer readable storage medium of claim 12, wherein the automated testing script command enables the testing framework system to control the software application.

14. The computer readable storage medium of claim 9, wherein the natural language command specifies at least one of the condition, the variable, or the command utilized to test the software application.

15. The computer readable storage medium of claim 9, further comprising
storing the generated automated test case script in a memory coupled to the processing device.

16. The computer readable storage medium of claim 9, further comprising:
providing the automated test case script to the testing framework system to test the software application.

17. A system, comprising:
a memory; and
a processing device coupled with the memory to:
- receive from a user a natural language test case for testing a software application, wherein the natural language test case is a test case written in a natural language, the test case comprising at least one of a condition, a variable, or a command that is executed by the software application to determine whether the software application is working according to program specifications, the natural language test case comprising a natural language command, wherein the natural language command is written as a user speaks and is distinct from a computer programming command;
- parse the received natural language test case to locate one or more search terms used to search for a corresponding term associated with an automated testing script command;
- cause a search of a testing framework system to be performed for the automated testing script command, wherein the one or more search terms are used to search at least one of an index or a document to locate the corresponding term associated with the automated testing script command, wherein the corresponding term is distinct from the automated testing script command and used to locate the automated testing script command; and
- generate an automated test case script that corresponds to the natural language test case based on a result of the search, wherein the automated test case script comprises the automated test script command.

18. The system of claim 17, wherein the processing device is further to:
- receive an automated test script template; and
- generate the automated test script by writing the automated testing script command to the automated test script template.

19. The system of claim 18, wherein the test script template is an empty script program and the processing device is further to populate the empty script program with the automated testing script command to create an automated testing program executable by the testing framework system.

20. The system of claim 17, wherein the processing device is further to:
- transmit the one or more search terms to the testing framework system; and
- receive the automated testing script command from the testing framework system, the automated testing script command being located by the testing framework system in a search based on the one or more search terms.

* * * * *